(12) United States Patent
Li et al.

(10) Patent No.: US 12,162,471 B2
(45) Date of Patent: Dec. 10, 2024

(54) NEURAL-NETWORK BASED MTPA, FLUX-WEAKENING AND MTPV FOR IPM MOTOR CONTROL AND DRIVES

(71) Applicant: The Board of Trustees of the University of Alabama, Tuscaloosa, AL (US)

(72) Inventors: Shuhui Li, Northport, AL (US); Weizhen Dong, Pomona, CA (US); Yixiang Gao, Pomona, CA (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 270 days.

(21) Appl. No.: 17/816,821

(22) Filed: Aug. 2, 2022

(65) Prior Publication Data

US 2023/0032672 A1   Feb. 2, 2023

Related U.S. Application Data

(60) Provisional application No. 63/228,226, filed on Aug. 2, 2021.

(51) Int. Cl.
*H02P 21/00* (2016.01)
*B60W 20/30* (2016.01)
*B60W 50/12* (2012.01)

(52) U.S. Cl.
CPC ............ *B60W 20/30* (2013.01); *B60W 50/12* (2013.01); *B60W 2510/082* (2013.01); *B60W 2510/083* (2013.01)

(58) Field of Classification Search
CPC ................. B60W 20/30; B60W 50/12; B60W 2510/082; B60W 2510/083; A63C 17/12
See application file for complete search history.

(56) References Cited

U.S. PATENT DOCUMENTS

| | | | |
|---|---|---|---|
| 8,432,121 B2 | 4/2013 | Lendenmann et al. |
| 8,742,705 B2 | 6/2014 | Yoo |
| (Continued) | | | |

OTHER PUBLICATIONS

Guo, Lusu, and Leila Parsa. "Model reference adaptive control of five-phase IPM motors based on neural network." IEEE Transactions on Industrial Electronics 59.3 (2011): 1500-1508.

(Continued)

*Primary Examiner* — Cortez M Cook
(74) *Attorney, Agent, or Firm* — Meunier Carlin & Curfman LLC

(57) ABSTRACT

A method for determining MTPA, flux-weakening, and MTPV operating points over the full speed range of an IPM motor for the most efficient torque control of the motor using a neural network is provided. The neural network is trained using a cloud-based neural network training algorithm. A special technique is developed to generate neural network training data, that is particularly suitable and favorable, to develop a high-performance neural network-based IPM torque control system, and the impact of variable motor parameters is embedded into the neural network system development and training. The provided method can achieve a fast and accurate current reference generation with a simple neural network structure, for optimal torque control of an IPM motor. The method can handle the MTPA, MTPV, and flux-weakening operation considering physical motor constraints.

19 Claims, 12 Drawing Sheets

(56) References Cited

U.S. PATENT DOCUMENTS

| | | | |
|---|---|---|---|
| 10,293,243 B1* | 5/2019 | Doerksen | A63C 17/12 |
| 10,367,437 B2 | 7/2019 | Li et al. | |
| 2006/0138994 A1* | 6/2006 | Cheng | H02P 21/34 |
| | | | 318/807 |
| 2020/0266743 A1* | 8/2020 | Li | H02P 21/0014 |

OTHER PUBLICATIONS

Lin, Ping-Yi, et al. "Infinite speed drives control with MTPA and MTPV for interior permanent magnet synchronous motor." IECON 2014—40th Annual Conference of the IEEE Industrial Electronics Society. IEEE, 2014.

Halder, Sukanta, S. P. Srivastava, and Pramod Agarwal. "Flux weakening control algorithm with MTPA control of PMSM drive." 2014 IEEE 6th India International Conference on Power Electronics (IICPE). IEEE, 2014.

Xia, Zekun, et al. "Computation-efficient online optimal tracking method for permanent magnet synchronous machine drives for mtpa and flux-weakening operations." IEEE Journal of Emerging and Selected Topics in Power Electronics 9.5 (2020): 5341-5353.

Zhai, T. Sun and J. Wang, "Electronic Stability Control Based on Motor Driving and Braking Torque Distribution for a Four In-Wheel Motor Drive Electric Vehicle," in IEEE Transactions on Vehicular Technology, vol. 65, No. 6, pp. 4726-4739, Jun. 2016, doi: 10.1109/TVT.2016.2526663.

Dong, W., Li, S., Fu, X., Li, Z., Fairbank, M., & Gao, Y. (2021). Control of a Buck DC/DC Converter Using Approximate Dynamic Programming and Artificial Neural Networks. IEEE Transactions on Circuits and Systems I: Regular Papers, 68(4), 1760-1768. doi:10.1109/tcsi.2021.3053468.

X. Liu, H. Chen, J. Zhao, and A. Belahcen, "Research on the Performances and Parameters of Interior PMSM Used for Electric Vehicles," IEEE Trans. Ind. Electron., vol. 63, No. 6, pp. 3533-3545, Jun. 2016, doi: 10.1109/TIE.2016.2524415.

T. M. Jahns, G. B. Kliman, and T. W. Neumann, "Interior Permanent-Magnet Synchronous Motors for Adjustable-Speed Drives," IEEE Trans. on Ind. Applicat., vol. IA-22, No. 4, pp. 738-747, Jul. 1986, doi: 10.1109/TIA.1986.4504786.

S. Morimoto, M. Sanada, and Y. Takeda, "Wide-speed operation of interior permanent magnet synchronous motors with high-performance current regulator," IEEE Trans. on Ind. Applicat., vol. 30, No. 4, pp. 920-926, Aug. 1994, doi: 10.1109/28.297908.

J. Lara, J. Xu, and A. Chandra, "Effects of Rotor Position Error in the Performance of Field Oriented Controlled PMSM Drives for Electric Vehicle Traction Applications," IEEE Trans. Ind. Electron., pp. 1-1, 2016, doi: 10.1109/TIE.2016.2549983.

T. Windisch and W. Hofmann, "A Novel Approach to MTPA Tracking Control of AC Drives in Vehicle Propulsion Systems," IEEE Trans. Veh. Technol., vol. 67, No. 10, pp. 9294-9302, Oct. 2018, doi: 10.1109/TVT.2018.2861083.

T. M. Jahns, "Flux-Weakening Regime Operation of an Interior Permanent-Magnet Synchronous Motor Drive," IEEE Trans. on Ind. Applicat., vol. IA-23, No. 4, pp. 681-689, Jul. 1987, doi: 10.1109/TIA.1987.4504966.

T.-S. Kwon, G.-Y. Choi, M.-S. Kwak, and S.-K. Sul, "Novel Flux-Weakening Control of an IPMSM for Quasi-Six-Step Operation," IEEE Trans. on Ind. Applicat., vol. 44, No. 6, pp. 1722-1731, 2008, doi: 10.1109/TIA.2008.2006305.

L. Sepulchre, M. Fadel, M. Pietrzak-David, and G. Porte, "MTPV Flux-Weakening Strategy for PMSM High Speed Drive," IEEE Transactions on Industry Applications, vol. 54, No. 6, pp. 6081-6089, Nov. 2018, doi: 10.1109/TIA.2018.2856841.

H. Ge, Y. Miao, B. Bilgin, B. Nahid-Mobarakeh, and A. Emadi, "Speed Range Extended Maximum Torque Per Ampere Control for PM Drives Considering Inverter and Motor Nonlinearities," IEEE Trans. Power Electron., vol. 32, No. 9, pp. 7151-7159, Sep. 2017, doi: 10.1109/TPEL.2016.2630051.

H. W. de Kock, A. J. Rix, and M. J. Kamper, "Optimal Torque Control of Synchronous Machines Based on Finite-Element Analysis," IEEE Transactions on Industrial Electronics, vol. 57, No. 1, pp. 413-419, Jan. 2010, doi: 10.1109/TIE.2009.2030209.

Bing Cheng and T. R. Tesch, "Torque Feedforward Control Technique for Permanent-Magnet Synchronous Motors," IEEE Trans. Ind. Electron., vol. 57, No. 3, pp. 969-974, Mar. 2010, doi: 10.1109/TIE.2009.2038951.

L. Ortombina, F. Tinazzi, and M. Zigliotto, "Adaptive Maximum Torque per Ampere Control of Synchronous Reluctance Motors by Radial Basis Function Networks," IEEE J. Emerg. Sel. Topics Power Electron., vol. 7, No. 4, pp. 2531-2539, Dec. 2019, doi: 10.1109/JESTPE.2018.2858842.

H.-S. Kim, Y. Lee, S.-K. Sul, J. Yu, and J. Oh, "Online MTPA Control of IPMSM Based on Robust Numerical Optimization Technique," IEEE Trans. on Ind. Applicat., vol. 55, No. 4, pp. 3736-3746, Jul. 2019, doi: 10.1109/TIA.2019.2904567.

Q. Liu and K. Hameyer, "High-Performance Adaptive Torque Control for an IPMSM With Real-Time MTPA Operation," IEEE Trans. Energy Convers., vol. 32, No. 2, pp. 571-581, Jun. 2017, doi: 10.1109/TEC.2016.2633302.

K. D. Hoang and H. K. A. Aorith, "Online Control of IPMSM Drives for Traction Applications Considering Machine Parameter and Inverter Nonlinearities," IEEE Trans. Transp. Electrific., vol. 1, No. 4, pp. 312-325, Dec. 2015, doi: 10.1109/TTE.2015.2477469.

S.-Y. Jung and K. Nam, "Current Minimizing Torque Control of the IPMSM Using Ferrari's Method," IEEE Transactions on Power Electronics, vol. 28, No. 12, p. 15, 2013.

Z. Han, J. Liu, W. Yang, D. B. Pinhal, N. Reiland, and D. Gerling, "Improved Online Maximum-Torque-Per-Ampere Algorithm for Speed Controlled Interior Permanent Magnet Synchronous Machine," IEEE Trans. Ind. Electron., vol. 67, No. 5, pp. 3398-3408, May 2020, doi: 10.1109/TIE.2019.2918471.

F.-J. Lin, Y.-T. Liu, and W.-A. Yu, "Power Perturbation Based MTPA With an Online Tuning Speed Controller for an IPMSM Drive System," IEEE Trans. Ind. Electron., vol. 65, No. 5, pp. 3677-3687, May 2018, doi: 10.1109/TIE.2017.2762634.

Z. Li, G. Feng, C. Lai, W. Li, and N. C. Kar, "Machine Parameter-Independent Maximum Torque Per Ampere Control for Dual Three-Phase PMSMs," IEEE Trans. Transp. Electrific., vol. 5, No. 4, pp. 1430-1440, Dec. 2019, doi: 10.1109/TTE.2019.2953656.

L. Ortombina, F. Tinazzi, and M. Zigliotto, "Magnetic Modeling of Synchronous Reluctance and Internal Permanent Magnet Motors Using Radial Basis Function Networks," IEEE Trans. Ind. Electron., vol. 65, No. 2, pp. 1140-1148, Feb. 2018, doi: 10.1109/TIE.2017.2733502.

S. Li, H. Won, X. Fu, M. Fairbank, D. C. Wunsch, and E. Alonso, "Neural-Network Vector Controller for Permanent-Magnet Synchronous Motor Drives: Simulated and Hardware-Validated Results," IEEE Trans. Cybern., vol. 50, No. 7, pp. 3218-3230, Jul. 2020, doi: 10.1109/TCYB.2019.2897653.

F.-J. Lin, M.-S. Huang, S.-G. Chen, and C.-W. Hsu, "Intelligent Maximum Torque per Ampere Tracking Control of Synchronous Reluctance Motor Using Recurrent Legendre Fuzzy Neural Network," IEEE Trans. Power Electron., vol. 34, No. 12, pp. 12080-12094, Dec. 2019, doi: 10.1109/TPEL.2019.2906664.

J. Chen, J. Li, and R. Qu, "Maximum-Torque-per-Ampere and Magnetization-State Control of a Variable-Flux Permanent Magnet Machine," IEEE Trans. Ind. Electron., vol. 65, No. 2, pp. 1158-1169, Feb. 2018, doi: 10.1109/TIE.2017.2733494.

M. T. Hagan and M. B. Menhaj, "Training feedforward networks with the Marquardt algorithm," IEEE Trans. Neural Netw., vol. 5, No. 6, pp. 989-993, Nov. 1994, doi: 10.1109/72.329697.

"JMAG-RT Model Library," Simulation Technology for Electromechanical Design: JMAG. https://www.jmag-international.com/modellibrary/ (accessed Oct. 24, 2020).

E. Armando, R. I. Bojoi, P. Guglielmi, G. Pellegrino, and M. Pastorelli, "Experimental Identification of the Magnetic Model of Synchronous Machines," IEEE Trans. on Ind. Applicat., vol. 49, No. 5, pp. 2116-2125, Sep. 2013, doi: 10.1109/TIA.2013.2258876.

\* cited by examiner

800

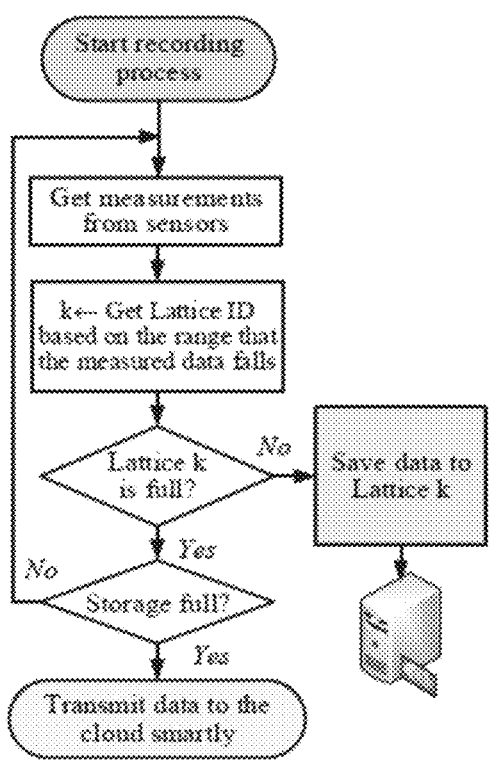 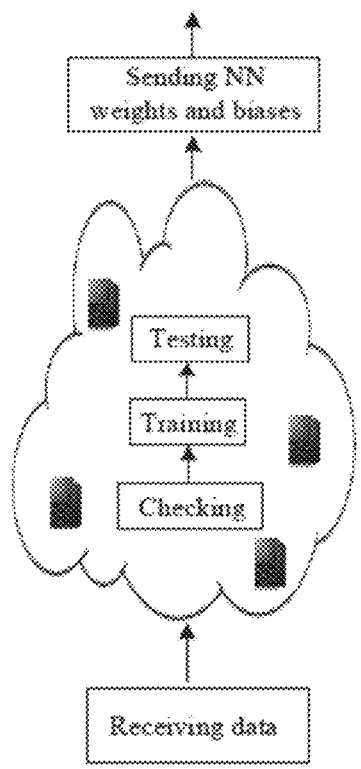
900
FIG. 9A
910
FIG. 9B

1000

1100

NEURAL-NETWORK BASED MTPA, FLUX-WEAKENING AND MTPV FOR IPM MOTOR CONTROL AND DRIVES

CROSS-REFERENCE TO RELATED APPLICATIONS

The present application claims priority to U.S. Provisional Application Ser. No. 63/228,226 filed on Aug. 2, 2021, and titled "NEURAL-NETWORK BASED MTPA, FLUX-WEAKENING AND MTPV FOR IPM MOTOR CONTROL AND DRIVES."

BACKGROUND

Permanent-magnet synchronous machines (PMSM) are widely used in industry because of their benefits such as high efficiency, high power density, and high torque density. Interior permanent magnet (IPM) synchronous machine is one type of PMSM which is suitable for the operation over a wide speed range due to their magnet location design and relative high saliency. Especially for vehicular propulsion systems, IPM drives are able to meet the requirements for two operation modes, constant torque operation under base speed and field-weakening operation in higher speed range. For the IPM motor drive control, these two operations are restricted by the machine torque limit, speed limit, and inverter voltage and current ratings. To have a good performance in the constant torque operation region, optimal and highly efficient control strategies, such as the maximum-torque-per-ampere (MTPA) approach, are usually adopted. The MTPA technique generates an optimum dq-axis current combination with the minimum stator current to achieve the desired torque, which reduces the motor copper loss. When the speed increases into the high-speed range, the stator voltage will reach the rated value and the flux-weakening (FW) control is adopted. The IPM motor drive will then work at the voltage limit to generate the maximum available torque. If the center point of the voltage limit is within the current limit circle, the maximum-torque-per-volt (MTPV) rule is required in the flux-weakening region as the speed continues to increase.

There are several challenges to achieve the optimal and high-efficient control for the motor operation over its full speed range in MTPA, flux-weakening, and MTPV regions. 1) Nonlinear optimization problems are complex to solve considering voltage, flux and current constraints. 2) These constraints are affected by the DC link voltage fluctuation and speed changes. 3) The IPM motor parameters are nonlinear and vary with stator currents due to the saturation and cross-magnetization effects.

SUMMARY

A method for determining MTPA, flux-weakening, and MTPV operating points over the full speed range of an IPM motor for the most efficient torque control of the motor using a neural network is provided. The neural network is trained using a cloud-based neural network training algorithm. A special technique is developed to generate neural network training data, that is particularly suitable and favorable, to develop a high-performance neural network-based IPM torque control system, and the impact of variable motor parameters is embedded into the neural network system development and training. The provided method can achieve a fast and accurate current reference generation with a simple neural network structure, for optimal torque control of an IPM motor. The method can handle the MTPA, MTPV, and flux-weakening operation considering physical motor constraints.

In an embodiment, a method for controlling an interior permanent magnet (IPM) motor is provided. The method includes: receiving a request for torque from a computing device; using a neural network to calculate a set of reference currents for the requested torque; and applying the set of reference currents to the IPM motor.

Embodiments may include some or all of the following features. The set of reference currents may include a d-reference current and a q-reference current. The IPM motor may be part of an electric vehicle and request for torque may be received from a control component of the electric vehicle. The method may further include: calculating a flux linkage limit for the IPM motor; and using the neural network to calculate the set of reference currents for the requested torque and the calculated flux linkage. The method may further include: determining an inverter DC voltage of the IPM motor; determining a current speed of the IPM motor; and calculating the flux linkage limit based on the inverter DC voltage and the current speed. The method may further include: collecting training data for the neural network in a cloud-based computing environment; and training the neural network using the training data in the cloud-based computing environment. Collecting the training data may include collecting sufficient training data to cover a plurality of different IPM motor operations over a full speed range of the IPM motor. Collecting the training data may include collecting a plurality of input tuples using the IPM motor, wherein each tuple comprises a torque value, a flux input limit, and optimal d-current and q-current values for the torque value and the flux input limit. The training data may be collected in a random manner.

In an embodiment, a method for training a neural network to generate optimal reference currents for an IPM motor. The method includes: determining optimal reference currents for an IPM motor for a plurality of desired torque values and a plurality of flux input limits by a computing device; generating training data for the IPM motor, wherein the training data comprises a plurality of tuples and each tuple comprises a torque value of the desired torque values, a flux input limit of the plurality of flux input limits, and optimal reference currents determined for the torque value and the flux input limit by the computing device; and training a first neural network using the generated training data by the computing device.

Embodiments may include some or all of the following features. The first neural network may be trained in a cloud-computing environment. The method may further include: receiving a request for torque; passing the requested torque through a torque limiter to ensure that the requested torque is below a maximum allowable torque; after passing the requested torque through the torque limiter, using the first neural network to calculate a set of optimal reference currents for the requested torque; and applying the set of reference currents to the IPM motor. The torque limiter may include a second neural network. The IPM motor may be part of an electric vehicle and request for torque is received from a control component of the electric vehicle. The method may further include: calculating a flux linkage limit for the IPM motor; and using the neural network to calculate the set of reference currents for the requested torque and the calculated flux linkage limit. The method may further include: determining an inverter DC voltage of the IPM motor; determining a current speed of the IPM motor; and calculating the flux linkage limit based on the inverter DC voltage and the current speed.

In an embodiment, an electric vehicle is provided. The vehicle includes: an IPM motor; a neutral network; and a control system adapted to: receive a request for torque; use the neural network to calculate a set of reference currents for the requested torque; and apply the set of reference currents to the IPM motor.

Embodiments may include some or all of the following features. The set of reference currents may include a d-reference current and a q-reference current. The control system may be adapted to: calculate a flux linkage limit for the IPM motor; and use the neural network to calculate the set of reference currents for the requested torque and the calculated flux linkage limit. The control system may be adapted to: determine an inverter DC voltage of the IPM motor; determine a current speed of the IPM motor; and calculate the flux linkage limit based on the inverter DC voltage and the current speed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIGS. 9A and 9B are illustrations of example methods for cloud-based data collection and cloud-based neural network training;

DETAILED DESCRIPTION

1 Torque Control of IPM Motor

Figure 1:
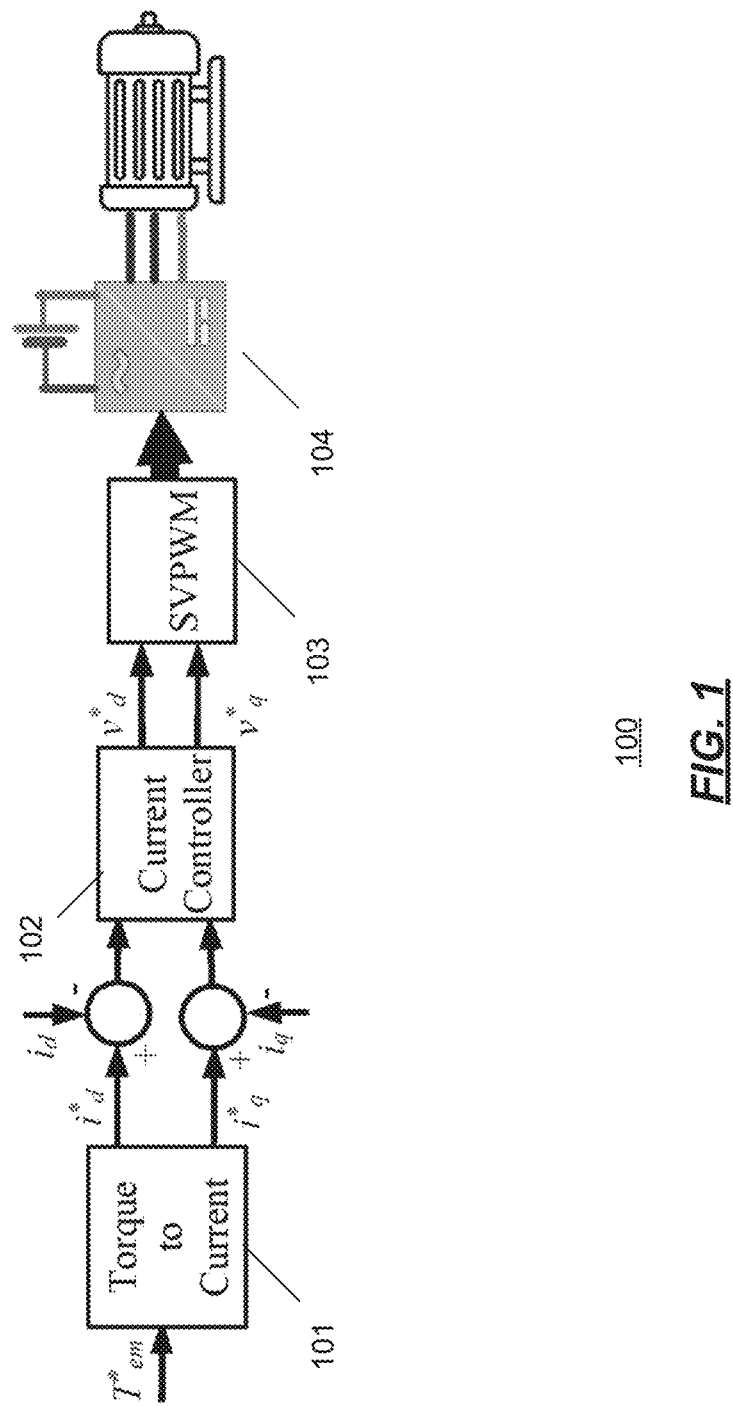
FIG. 1 is an illustration of an example IPM motor.

Torque control of an IPM motor is usually achieved through the configuration 100 shown in FIG. 1. Basically, a reference torque command $T^*_{em}$ is first converted into motor d- and q-axis current references, $i^*_d$ and $i^*_q$ by a Torque to Current converter 101. Then, a current controller 102 regulates the motor stator currents, $i_d$ and $i_q$, to follow the reference currents. The current controller 102 outputs d- and q-axis control voltages, $v^*_d$ and $v^*_q$, which control the operation of a IPM motor 104 normally via a space vector pulse-width modulation (SVPWM) scheme 103.

1.1. IPM Model in DQ Reference Frame

Based on the Park-Clarke transformation, the stator dq flux linkages of an IPM motor are described by:

$$\begin{bmatrix} \lambda_d \\ \lambda_q \end{bmatrix} = \begin{bmatrix} L_d & 0 \\ 0 & L_q \end{bmatrix} \begin{bmatrix} i_d \\ i_q \end{bmatrix} + \begin{bmatrix} \lambda_{pm} \\ 0 \end{bmatrix} \quad (1)$$

where $\lambda_d$, $\lambda_q$, $L_d$, $L_q$, $i_d$ and $i_q$ are stator d- and q-axis flux linkages, inductances, and currents, and $\lambda_{pm}$ is the flux linkage of the rotor permanent-magnet. The stator dq voltage equation is:

$$\begin{bmatrix} v_d \\ v_q \end{bmatrix} = R \begin{bmatrix} i_d \\ i_q \end{bmatrix} + \frac{d}{dt} \begin{bmatrix} \lambda_d \\ \lambda_q \end{bmatrix} + \omega_e \begin{bmatrix} -\lambda_q \\ \lambda_d \end{bmatrix} \quad (2)$$

where $v_d$ and $v_q$ are d- and q-axis stator voltages, and $\omega_e$ is the motor electrical speed. The steady-state voltage equation is:

$$v_d = Ri_d - \omega_e \lambda_q = Ri_d - \omega_e L_q i_q \quad (3a)$$

$$v_q = Ri_q + \omega_e \lambda_d = Ri_q + \omega_e(L_d i_d + \lambda_{pm}) \quad (3b)$$

The electromagnetic torque of the motor can be written as:

$$T_{em} = \frac{p}{2}(\lambda_d i_q - \lambda_q i_d) = \frac{p}{2}[\lambda_{pm} + (L_d - L_q)i_d]i_q \quad (4)$$

1.2. Torque Control of an IPM Motor

According to (4), for a given torque command T*em, there are multiple current vectors that can generate the specified torque. Hence, in order to get the most efficient current references and, at the same time, assure the motor operation within its physical constraints, the conversion from a torque reference to the current reference should be obtained by considering the following equations:

$$\text{Minimize } \sqrt{i_d^2 + i_q^2} \text{ as much as possible} \quad (5a)$$

$$\text{Subject to:} T^*_{em} = \frac{P}{2}(\lambda_d i_q - \lambda_q i_d) \quad (5b)$$

$$\sqrt{i_d^2 + i_q^2} \leq i_{max} \quad (5c)$$

$$\sqrt{v_d^2 + v_q^2} = \sqrt{[\omega_e(L_d i_d + \lambda_{pm})]^2 + (\omega_e L_q i_q)^2} \leq \quad (5d)$$

$$v_{max} \text{ or } \sqrt{(L_d i_d + \lambda_{pm})^2 + (L_q i_q)^2} \leq \frac{V_{dc}}{\sqrt{2}\omega_e} = \lambda_{lim,\omega_e}$$

where (5a) means that the amplitude of the current reference should be as small as possible; (5b) stands for that the actual motor torque should equal the command torque; (5c) requires that the amplitude of the current reference should not exceed the rated current limit of the motor and inverter; (5d) means that the current reference should not require a voltage higher than the maximum voltage $v_{max}=V_{dc}/\sqrt{2}$ that the inverter can provide under the SVPWM, or that the current reference should not require a flux linkage higher than the maximum flux linkage $\lambda_{lim,\omega_e}=V_{dc}/\sqrt{2}$ that can be provided at speed $\omega_e$. Within the stator d- and q-axis current plane, i.e., $i_d$ and $i_q$ plane (FIG. 2), the current limit is shown in the graph 200 of FIG. 2 by one circle and the flux linkage limit is shown by multiple ellipses that shrink to the center point $$X = \left(-\frac{\lambda_{pm}}{L_d}, 0\right)$$

as the motor speed increases from 0 rad/sec to the infinity. Depending on the motor operating speed, the solution of the current reference from is illustrated in the graph 200 by the OA (MTPA), AB (flux weakening I), BC (flux weakening II), and CX (MTPV) segments.

1.3. The Nonlinearity of Motor Parameters

Figure 3:
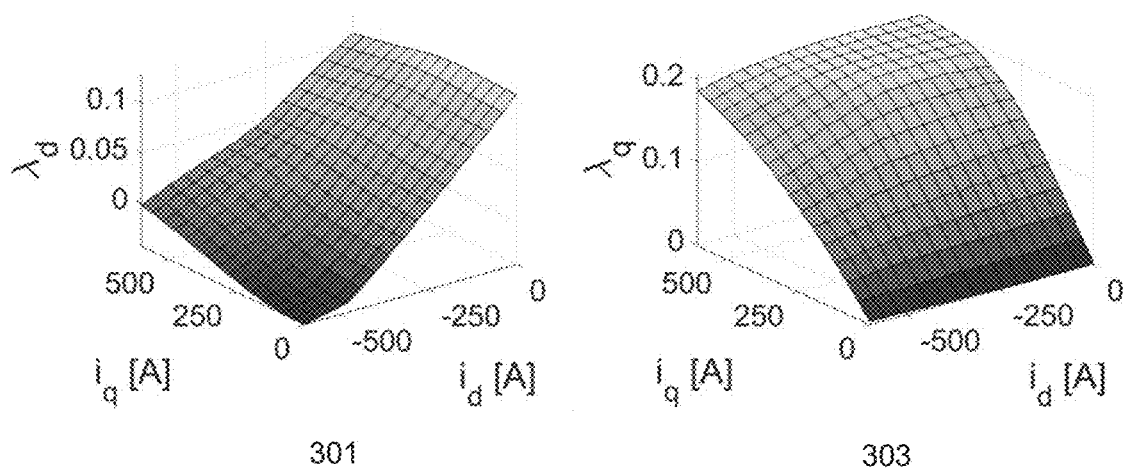
FIG. 3 is graphs illustrating the relation of d-axis and q-axis flux linkages with d-axis and q-axis currents.

One of the major challenges for the IPM motor control is the machine parameter variations as shown in the graphs 301 and 303 of FIG. 3. With the iron saturation and cross-saturation, the dq-axis flux-linkages are nonlinear and can be described as functions of stator currents: $\lambda_d(i_d, i_q)$ and $\lambda_q(i_d, i_q)$. To improve the accuracy of converting the torque reference to the current references, the parameter variation and nonlinear properties of the motor need to be properly addressed.

1.4. Conventional LUT Methods to Determine MTPA, Flux-Weakening and MTPV

Figure 4:
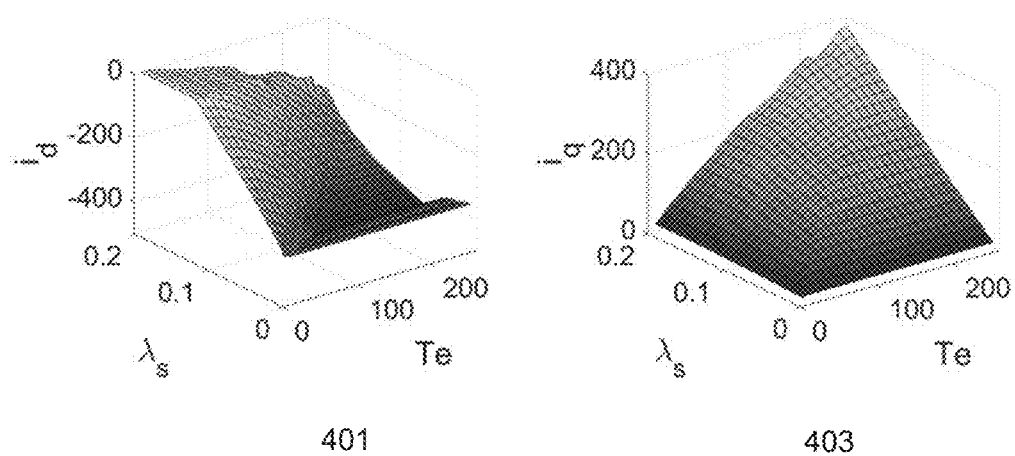
FIG. 4 is graphs illustrating the relation of optimal d-axis and q-axis currents with desired torque and flux linkage limits.

As discussed above, there have been several conventional methods to determine the MTPA, flux-weakening, and MTPV operating points for an IPM motor, among which the LUT approach is a widely used technique in motor drives and EV (electric vehicle) industry. The basic idea of the approach is to generate two lookup tables based on motor flux-linage or parameter LUTs:: 1) $i^*_d = f_d(T_{em}^*, \lambda_{lim,\omega_e})$ and 2) is $i^*_q = f_q(T_{em}^*, \lambda_{lim,\omega_e})$ as illustrated in the graphs 401 and 403 of FIG. 4. The generated LUTs will give the optimal d- and q-axis current references for the desired torque command under a given flux linkage limit at a motor operating speed and inverter DC voltage.

One advantage is that the motor d- and q-axis flux linkages, $\lambda_d(i_d, i_q)$ and $\lambda_q(i_d, i_q)$, can be embedded in the LUTs. Since the LUTs are generated offline, this method also has good stability and dynamic performance and does not have a high computational burden compared to the online-based methods. However, the disadvantage is the requirement for a large memory size to store the lookup tables. Also, the LUT size and interpolation methods will affect the accuracy in determining the d- and q-axis reference currents.

1.5 Online Methods of Determined MTPA, Flux-Weakening and MTPV

Online methods have also been developed recently by many researchers. An online method basically uses an online algorithm to determine or calculate optimal dq current based on a demanded torque. In a typical online method, premade parameter LUTs are still required to provide motor flux linkage or inductance information at different motor operating currents for the online algorithms. From this perspective, the advantage of the online method over the LUT methods shown do not dominate and the online method is still unable to handle the motor part-to-part variation and parameter variation over time. The inputs of an online method could contain 1) motor torque command, 2) maximum flux linkage limit, 3) motor parameters provided by the parameter LUTs, and 4) dq current at the previous time step that is needed for solving the online optimization problem iteratively over time. The input of the maximum flux linkage limit is not needed for online methods that focus on the MTPA only and is required for an online method that addresses both MTPA and flux weakening.

Overall, the mathematical foundation of an online method is the optimization problem shown in (5), which requires solving the optimization problem with constraints online. If the constraint (5d) is not considered, the corresponding online method focuses on MTPA only; otherwise, the online method addresses both MTPA and flux weakening. For a commanded torque, the optimal reference dq current is solved iteratively online over time based on the equation as illustrated below:

$$i^*_{dq}(k) = i_{dq}(k-1) + \Delta i_{dq}(k) \qquad (6)$$

where $i^*_{dq}(k)$ represents the reference current generated at the present time step, $i_{dq}(k-1)$ stands for the measured motor dq current or reference dq current at the previous time step, and $\Delta i_{dq}(k)$ is the current adjustment term that is obtained during each iterative process of solving the optimization problem (5) online. However, solving the optimization problem online is not easy. Especially when both MTPA and flux weakening are considered, the optimization problem would involve MTPA, flux-weakening region I, flux-weakening region II, and MTPV, in which each portion needs to be treated specifically and is slightly different from (5).

2 Proposed Neural Network Based MTPA, Flux-Weakening, and MTPV Control

Figure 5:
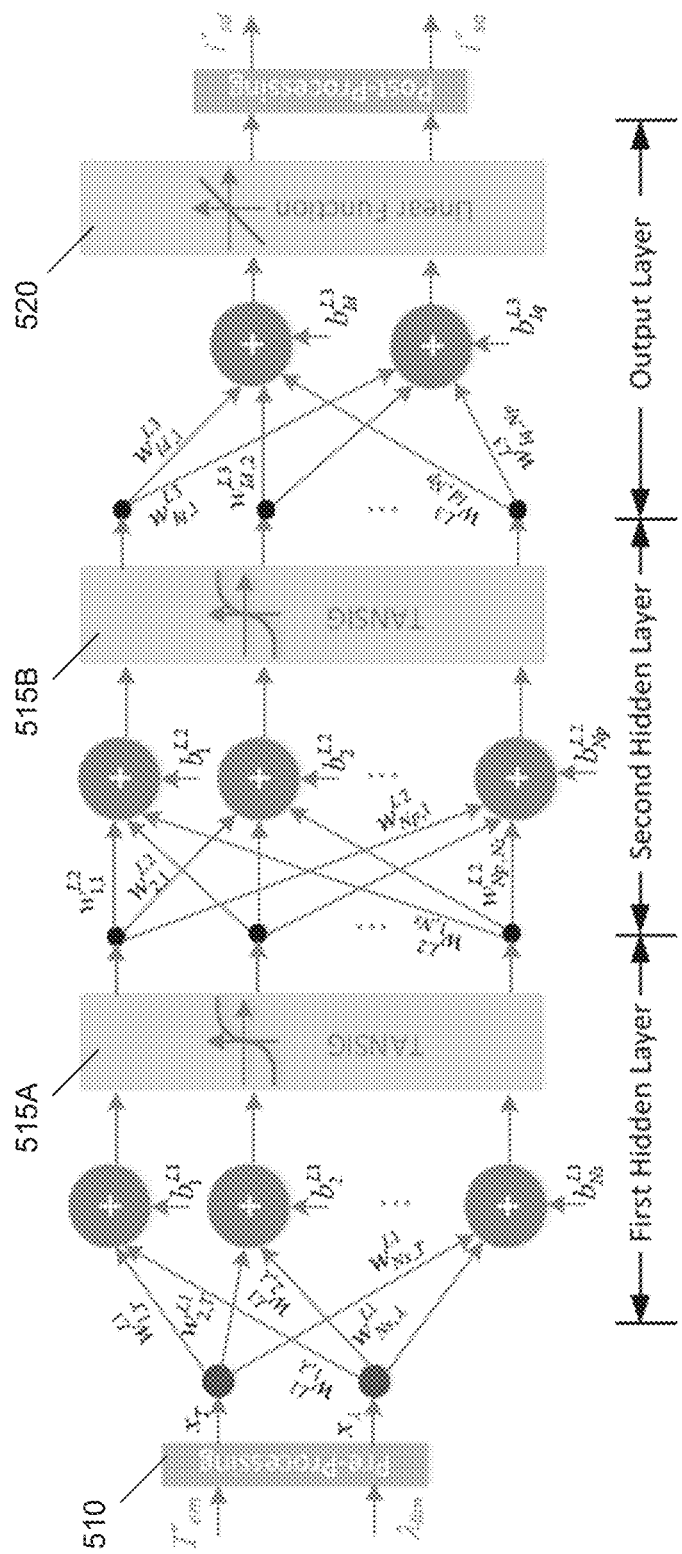
FIG. 5 is an illustration of an example neural network architecture.

The designed neural network structure is a feedforward neural network as shown in the network 500 of FIG. 5. Other types of neural networks may be supported. The neural network 500 consists of an input layer 510, hidden layers 515 (i.e. 515A and 515B) 515C), and an output layer 520. There are two inputs at the input layer 510, one is the desired torque command $T^*_{em}$ the other is the flux linkage limit $\lambda_{lim}$ which is calculated based on the inverter DC voltage and the motor speed. At the output layer 520, the two outputs are the dq reference currents $i^*_d$ and $i^*_q$. The selection of the number of hidden layers 515 and the number of neurons in each hidden layer 515 may be set by a user or administrator.

In the first hidden layer, the output of the $s^{th}$ neuron can be expressed as:

$$n_s^{L1} = w_{s,T}^{L1} \cdot x_T + w_{s,\lambda}^{L1} \cdot x_\lambda + b_s^{L1} \,\forall s \qquad (7)$$

where $x_T$ and $x_\lambda$ are the desired torque command and the flux linkage limit after preprocessing, $w_{s,T}^{L1}$ and $w_{s,\lambda}^{L1}$ are the input weights corresponding to $x_T$ and $x_\lambda$, and $b_s^{L1}$ is the bias for the $s^{th}$ neuron in the first hidden layer 515A. Then, the hyperbolic tangent sigmoid transfer function is applied for each neuron.

In the second hidden layer 515B, the $p^{th}$ neuron output is:

$$m_p^{L2} = \Sigma_{s=1}^{N_s} w_{p,s}^{L2} a_s^{L1} + b_p^{L2} \,\forall s, \,\forall p \qquad (8)$$

where $N_s$ is the number of neurons of the first hidden layer, $w_{p,s}^{L2}$ and $b_p^{L2}$ are the weights and bias for the $p^{th}$ neuron of the second hidden layer 515B. Similarly, the sigmoid function is adopted for the neuron outputs $m_p^{L2}$ of the second hidden layer 515B.

Then, the normalized reference currents $y_{Id}$ and $y_{Iq}$ are generated at the output layer 520:

$$y_{Id} = \Sigma N_{p=1}^{N_p} w_{Id,p}^{L3} a_p^{L2} + b_{Id}^{L3} \quad (9a)$$

$$y_{Iq} = \Sigma N_{p=1}^{N_p} w_{Iq,p}^{L3} a_p^{L2} + b_{Iq}^{L3} \quad (9b)$$

where $N_p$ is the number of neurons of the second hidden layer, $w_{Iq,p}^{L3}$, $b_{Id}^{L3}$ and $b_{Iq}^{L3}$ are the weights and the bias of the output layer 520.

The neural network inputs and outputs are related to the physical variables of torque, flux linkage, and stator d- and q-axis currents via pre- and post-processing by:

$$x_{T,i} = 2 \cdot \frac{T_{em,i}^* - \min(T_{em}^*)}{\max(T_{em}^*) - \min(T_{em}^*)} - 1 \quad (10a)$$

$$x_{\lambda,i} = 2 \cdot \frac{\lambda_{lim,i} - \min(\lambda_{lim})}{\max(\lambda_{lim}) - \min(\lambda_{lim})} - 1 \quad (10b)$$

$$i_{sd,i}^* = \frac{(y_{Id,i} + 1)(\max(i_{sd}^*) - \min(i_{sd}^*))}{2} + \min(i_{sd}^*) \quad (10c)$$

$$i_{sq,i}^* = \frac{(y_{Iq,i} + 1)(\max(i_{sq}^*) - \min(i_{sq}^*))}{2} + \min(i_{sq}^*) \quad (10d)$$

where $T^*_{em,i}$, $\lambda_{lim,i}$, $i^*_{d,i}$ and $i^*_q$ are the ith sample of the desired torque, flux linkage limit, d-axis current reference, and q-axis current reference, respectively; $T^*_{em}$, $\lambda_{lim}$, $i^*_d$, and $i^*_q$ represent the training data set of all the desired torques, flux linkage limits, d-axis current references, and q-axis current references, respectively.

Figure 2:
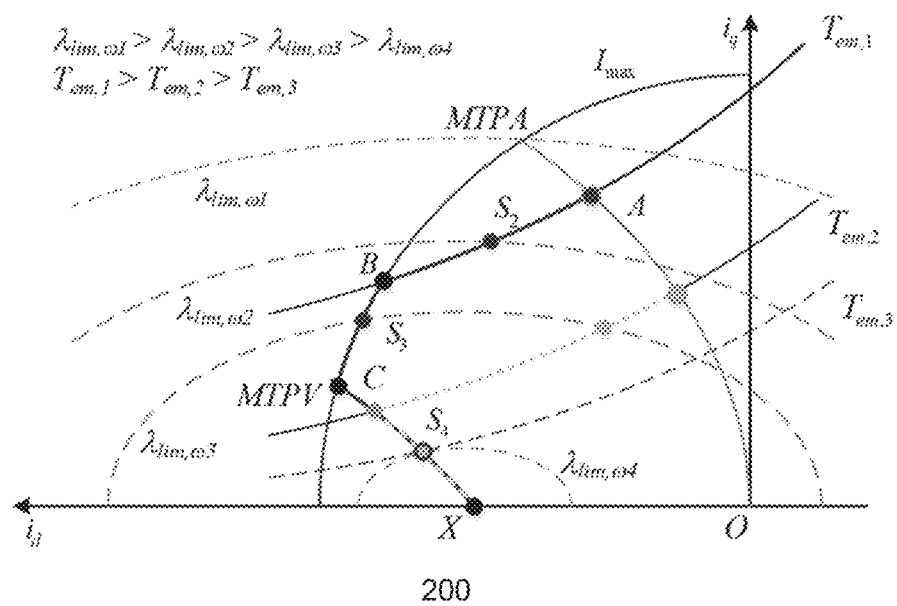
FIG. 2 is a graph of torque to reference currents considering both current and flux limits.
Figure 6:
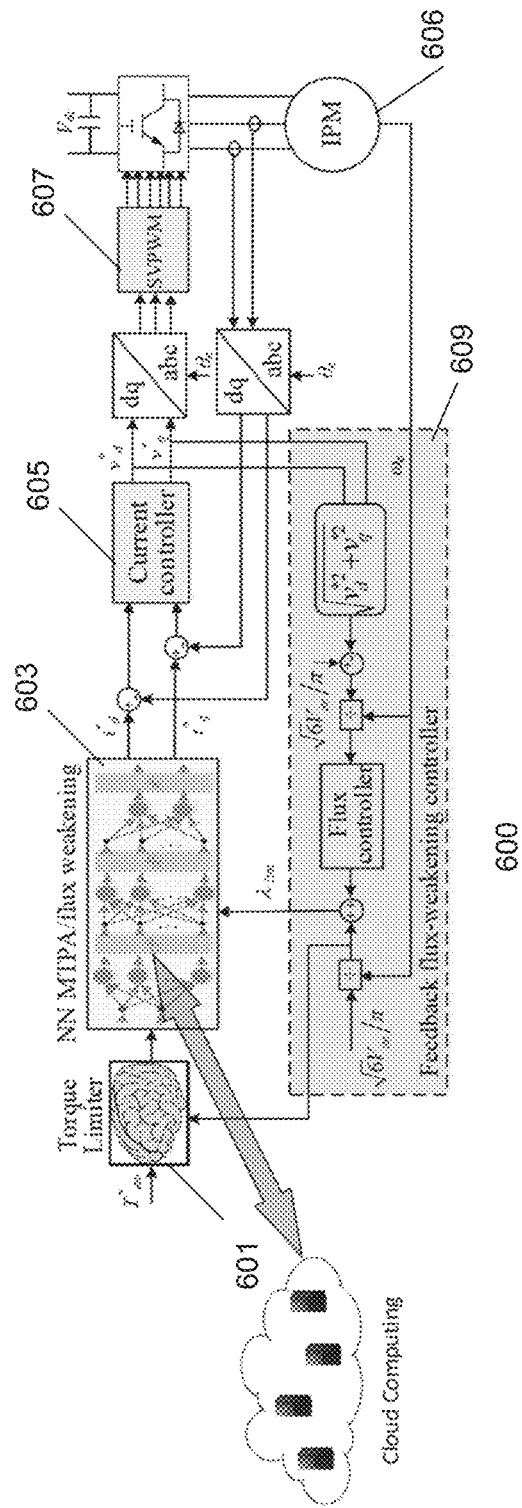
FIG. 6 is an illustration of an example neural network, IPM motor drive and control system.

The neural network in the overall IPM motor control system 600 is shown in FIG. 6. The desired torque first passes through a torque limiter block 601 to ensure that the torque reference presented to the neural network 603 is below the maximum allowable torque command for a given flux-linkage limit. The torque limiter block 601 may be implemented through a small neural network that is trained based on the maximum allowable torque data at the maximum current circle and the MTPV trajectory with respect to different flux limit lines (FIG. 2).

The neural network 603 converts the torque reference to d- and q-axis current references that are presented to a motor current controller 605. The current controller 605 outputs d- and q-axis control voltages to control the IPM motor 606 based on the SVPWM 607. To ensure the amplitude of the control voltage generated by the current controller 605 does not exceed the six-step voltage, a feedback flux weakening controller 609 is adopted in FIG. 6. The neural network needs to be trained. The objective is that after the training, the neural network can give the optimal d- and q-axis current references, in MTPA, flux-weakening I and II, and MTPV modes, for a desired torque demand and flux linkage limit under a specified motor speed and inverter DC voltage. To assure lifetime adaptivity and learning capabilities of both neural networks, a cloud computing framework is proposed to support efficient and reliable lifetime updates of both neural networks, based on routine offline training over the cloud computing platform. Details about the neural network training are shown in the following section.

3 Training Data Generation and Neural Network Training 3.1. Generation of Training Data The training data for the neural network consists of a large number of input-output pairs $[(T^*_{em}, \lambda_{lim}) \rightarrow (i^*_d, i^*_q)]$. The training data should be large and detailed enough to assure accurate, optimal, and efficient IPM operation under MTPA, flux-weakening, and MTPV modes. The data set for the neural network training consists of a large number of input-output pairs. Each pair contains two input data of desired torque command $T^*_{em}$ and flux linkage limit $\lambda_{lim}$, and two output data of optimal d- and q-axis reference currents $i^*_d$ and $i^*_q$. The data set should be large and detailed enough to assure accurate, optimal, and efficient IPM operation under MTPA, flux-weakening, and MTPV modes.

Figure 7:
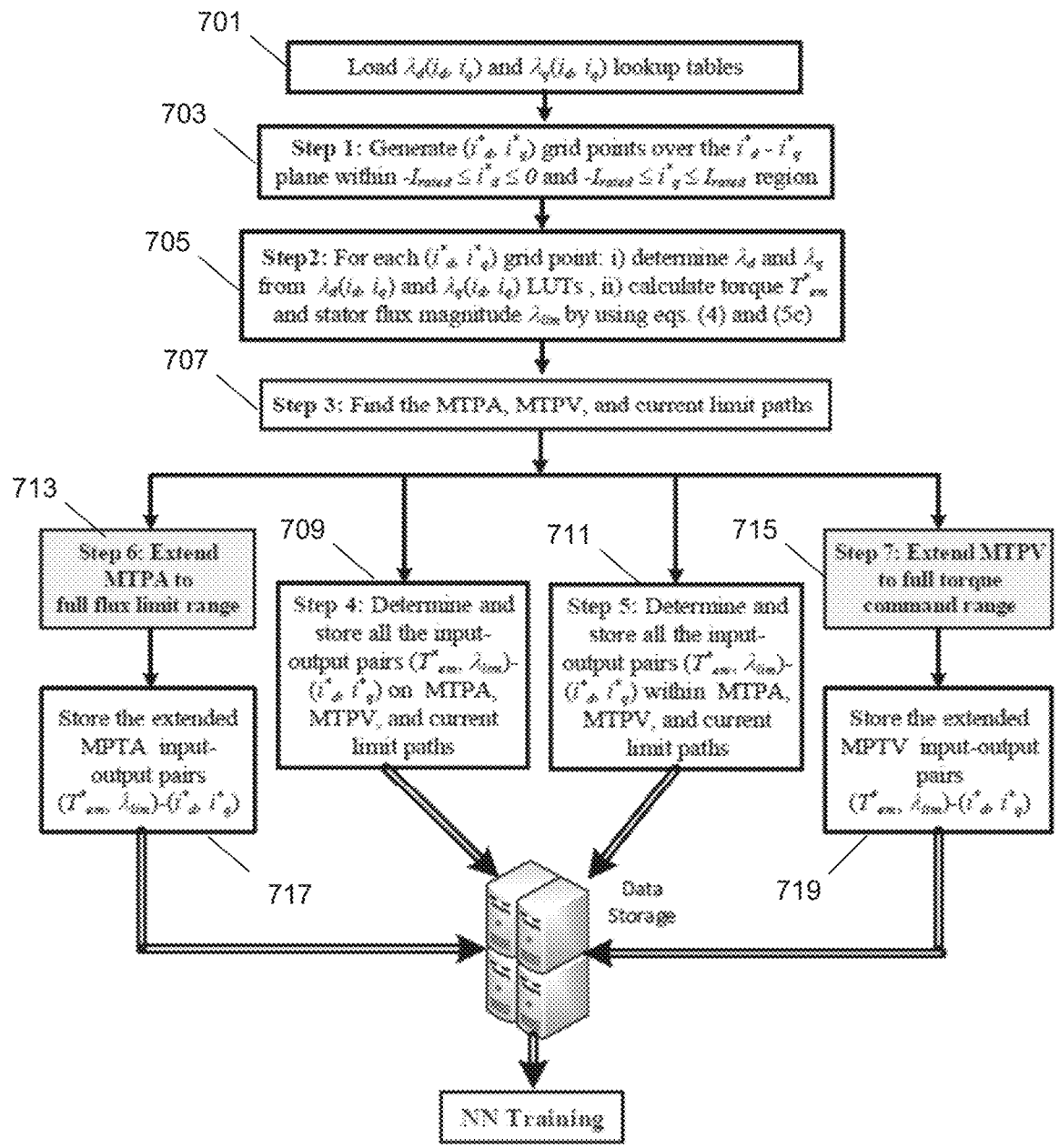
FIG. 7 is an illustration of an example method for generating training data.

FIG. 7 shows a flowchart of a method 700 to generate the training data. First, measured data of d- and q-axis flux leakages vs. d- and q-axis currents are loaded into a memory (701). Then, the training data generation follows these steps: 1) (703) generating $(i^*_d, i^*_q)$ grid points across $-I_{rated}$ and $+I_{rated}$ range over the $i^*_d \leftrightarrow i^*_q$ 2D plane, 2) (705) for each $(i^*_d, i^*_q)$ grid point, obtaining d- and q-axis flux leakages from $\lambda_d(i_d, i_q)$ and $\lambda_d(i_d, i_q)$ LUTs and then calculating torque $T^*_{em}$ and flux linkage limit $\lambda_{lim,\omega}$, 3) (707) finding MTPA, MTPV and current limited paths as illustrated in the graph 200 of FIG. 2 based on the data generated at Step 2, 4) (709) getting the training data corresponding to all the input-output pairs $[(T^*_{em}, \lambda_{lim}) \rightarrow (i^*_d, i^*_q)]$ along the MTPA path, current constraint path, and MTPV path and storing all the input-output pairs into the data storage, 5) (711) getting the training data corresponding to all the input-output pairs $[(T^*_{em}, \lambda_{lim}) \rightarrow (i^*_d, i^*_q)]$ inside the MTPA path, current constraint path, and MTPA path and storing all the input-output pairs into the data storage, 6) (713) extending the data generation along the MTPA path to the full flux range, and 7) (715) extending the data generation along the MTPV path to the full torque reference range. The need for Step 6 is due to the fact that the MTPA solution, $i^*_d$ and $i^*_q$ or a desired torque $T^*_{em}$ under $\lambda_{lim,\omega1}$ condition, as shown in FIG. 2, is also the MTPA solution of the same desired torque $T^*_{em}$ under any other has a value larger than that of $\lambda_{lim,\omega1}$. Thus, those input-output pairs $[(T^*_{em}, \lambda_{lim}) \rightarrow (i^*_d, i^*_q)]$ over the MTPA path should be included in the training data set (717). Similarly, the need for Step 7 is due to the fact that the MTPV solution, $i^*_d$ and $i^*_q$, under $\lambda_{lim,\omega3}$ condition for a desired torque $T^*_{em}$, as shown in FIG. 2, is also the MTPV solution of any other desired torque $T^*_{em,i}$ that has a value larger than that of $T^*_{em}$. Therefore, those input-output pairs over the MTPV path should also be included in the training data set (719).

Some other important characteristics about the training data generated using the proposed methods include: i) unlike the traditional LUT approaches, the training data can be stored in the data storage in a random manner instead of a well-structured style that is typically needed in order to search an $i^*_d$ and $i^*_q$ solution from the LUTs efficiently; ii) the motor parameter variation is embedded into the training data set because all the $i^*_d$ and $i^*_q$ solutions are obtained and calculated through actual measured data of $\lambda_d(i_d, i_q)$ and $\lambda_d(i_d, i_q)$ LUTs that contain the motor current impact on the flux linkages; iii) a large amount of training data can be added into the data storage conveniently to enable information equity and sufficiency to benefit the training and the trained neural network to handle the extremely nonlinear portions between the input data $(T^*_{em}, \lambda_{lim,\omega})$ and output data $(i^*_d, i^*_q)$ than other methods because the neural network has the ability to extract information through training from the data that is collected and stored irregularly and randomly, especially for the motor characteristics in these nonlinear positions. This will particularly benefit the online-based data collection and storage of the motor characteristics in these nonlinear portions for the cloud-based training of the neural network described herein. However, for a LUT approach, for example, the data must be collected and stored regularly because this is typically required for the design of an efficient interpolation algorithm.

3.2. Neural Network Training

The performance function used for training the neural network is:

$$C = \frac{1}{N}\sum_{k=1}^{N} \vec{e}_{dq}(k) \tag{11a}$$

$$\vec{e}_{dq}(k) = \sqrt{[i^*_{d\_NN}(k) - i^*_d(k)]^2 + [i^*_{q\_NN}(k) - i^*_q(k)]^2} \tag{11b}$$

where N is the total number of samples of the training data set, $i^*_d(k)$ and $i^*_q(k)$ are the target d- and q-axis current references of the kth training sample, and $i^*_{d\_NN}(k)$ and $i^*_{q\_NN}(k)$ are the corresponding neural network outputs.

The neural network is trained to minimize the performance function (11). The LMBP algorithm may be used to update the weights and biases at each training iteration. The LMBP algorithm is a variant of gradient descent which provides a nice compromise between the speed of Newton's method and the guaranteed convergence of the steepest descent and has proven to be one of the most powerful training algorithms for neural networks. In order to use the LMBP for training the neural network efficiently, the performance function is rewritten as:

$$C = \frac{1}{N}\sum_{k=1}^{N} \vec{e_{dq}}(k) \xleftrightarrow{\text{define } V(k)=\sqrt{\vec{e_{dq}(k)}}} C = \frac{1}{N}\sum_{k=1}^{N} (V(k))^2 \tag{12}$$

Then, the gradient $\partial C/\partial \vec{W}$ can be written in a matrix as:

$$\frac{\partial C}{\partial \vec{w}} = \frac{\partial \sum_{k=1}^{N}[V(k)]^2}{\partial \vec{w}} = \sum_{k=1}^{N} 2V(k)\frac{\partial V(k)}{\partial \vec{w}} = 2J(\vec{w})^T \vec{V} \tag{13}$$

where the Jacobian matrix $J(\vec{w})$ is:

$$J(\vec{w}) = \begin{bmatrix} \frac{\partial V(1)}{\partial w_1} & \cdots & \frac{\partial V(1)}{\partial w_M} \\ \vdots & \ddots & \vdots \\ \frac{\partial V(N)}{\partial w_1} & \cdots & \frac{\partial V(N)}{\partial w_M} \end{bmatrix}, \vec{V} = \begin{bmatrix} V(1) \\ \vdots \\ V(N) \end{bmatrix} \tag{14}$$

Therefore, the weight update is expressed by:

$$\Delta\vec{w} = -[J(\vec{w})^T J(\vec{w}) + \mu I]^{-1} J(\vec{w})^T \vec{V} \tag{15a}$$

$$\vec{w}_{update} = \vec{w} + \Delta\vec{w} \tag{15b}$$

where μ is the damping parameter.

Figure 8:
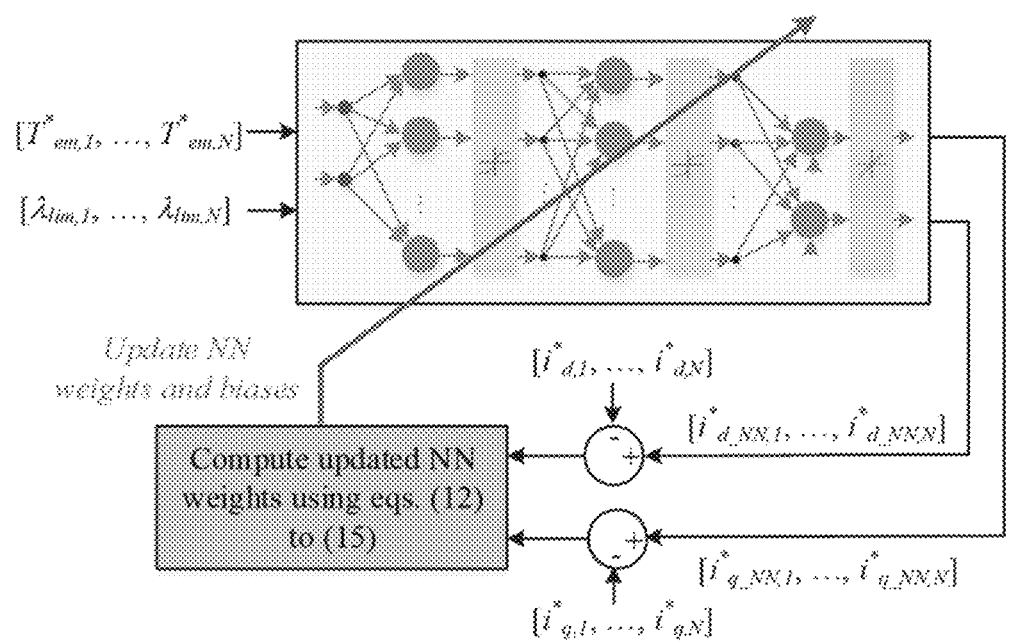
FIG. 8 is an illustration of an example method for training a neural network.

The training procedure for each epoch is illustrated in the diagram 800 of FIG. 8. The batch training method is adopted because of its fast convergence performance with smaller errors than other methods. For each iteration, all the stored data are used to generate the errors and Jacobian matrix. Then, the gradients are computed to update the weights and biases. The training stops when the performance function meets the requirement.

4 Data Collection and Cloud-Based Training

The proposed neural network will be first trained offline at the factory production stage based on the data of a sample IPM of the same motor type and then will be continuously trained offline over the cloud at the operating stage based on the data collected in real-life conditions for each individual IPM. In other words, there is no training that will be performed at the onboard computing facility of an EV.

4.1 Data Collection and Cloud-Based Training

The collection of the training data is different for the neural network development at the production and operation stages. At the production stage, the training data is collected from a sample test motor of the same motor type based on a set of experiments. During the experiments, the test motor is put on a dyno system, where the motor operating speed and driving torque can be adjusted and measurements of flux-current relations can be obtained directly or indirectly.

At the operation stage of each individual IPM motor, the training data is collected based on the real-time measurement of the motor during the online operation of an EV. The first task before the online data collection is to divide the motor operation ranges into multiple lattices in terms of motor d- and q-axis currents from $-I_{rated}$ to $+I_{rated}$. Each lattice will have a flag indicator to indicate whether there are sufficient data collected corresponding to that lattice, such as 10 data samples for a lattice. This is to ensure the appropriate data equity for the neural network training.

In general, the data collection process follows the following strategies. (i) Real-time measured data will be collected when the motor is in a steady-state condition and with no or minimum noise impact. (ii) Corresponding to each lattice discussed above, measured data will be saved into low-cost storage only when there is not enough data collected for a lattice. For example, when there are 10 data samples that have been collected and saved in the storage corresponding to a lattice, any new measured data will not be collected and saved into the storage for that lattice. (iii) After enough data are collected and saved into the storage corresponding to all the lattices, the online data collection process stops and the data is ready to be transmitted to the cloud for the neural network training over the cloud platform. (iv) After all the data is sent to and received by the cloud, the collection process is reinitialized, and the system is ready for the next-round data collection process.

FIG. 9A shows the flowchart of the online data collection process 900 at the operation stage of each individual IPM motor. It is necessary to point out that the data collection and storage process does not follow a well-defined structure that is typically needed by the data search algorithm of a LUT approach. In other words, data can be collected and stored in highly random order, which cannot be applied to other methods. In addition, data will be collected and transmitted to a remote cloud device for a time period of several weeks or months smartly based on the performance degradation evaluation of the IPM motor over the cloud.

For the routine offline training of the neural network over the cloud computing platform, it will follow the same strategy except that data needs to be collected and transmitted to a remote cloud device for the neural network training. Firstly, real-time motor operation data is collected smartly, meaning that only meaningful and valuable data is collected and stored, and data collected should cover the full operating range of the motor at the normal and critical conditions. When sufficient data is obtained, data is sent to a remote cloud computing device. Over the cloud system, a thorough evaluation of the newly obtained motor operation data will be conducted first to investigate whether there is a major deviation between the expected model performance and measured data. If the evaluation shows that there is only a minor deviation, the cloud system will not retrain and update the neural network and then send a signal to the remote EV to indicate that the data collection and transmission process can be slowed down. Otherwise, the neural network will be retrained and updated. After the training, the new neural network weights are transmitted back to the EV computer to replace the previous neural network weights. In addition, if the evaluation shows that there is a large deviation, the cloud system will send a signal to the remote EV to indicate that the data collection and transmission process needs to speed up.

FIG. 9B shows the flowchart of the process 910 for cloud-based neural network training. Such an offline learning strategy, based upon a cloud computing platform, will guarantee the safe and reliable neural network system development that cannot be achieved for an online neural network learning system, which will assure the high-performance operation of individual EV motor over its lifetime.

Figure 10:
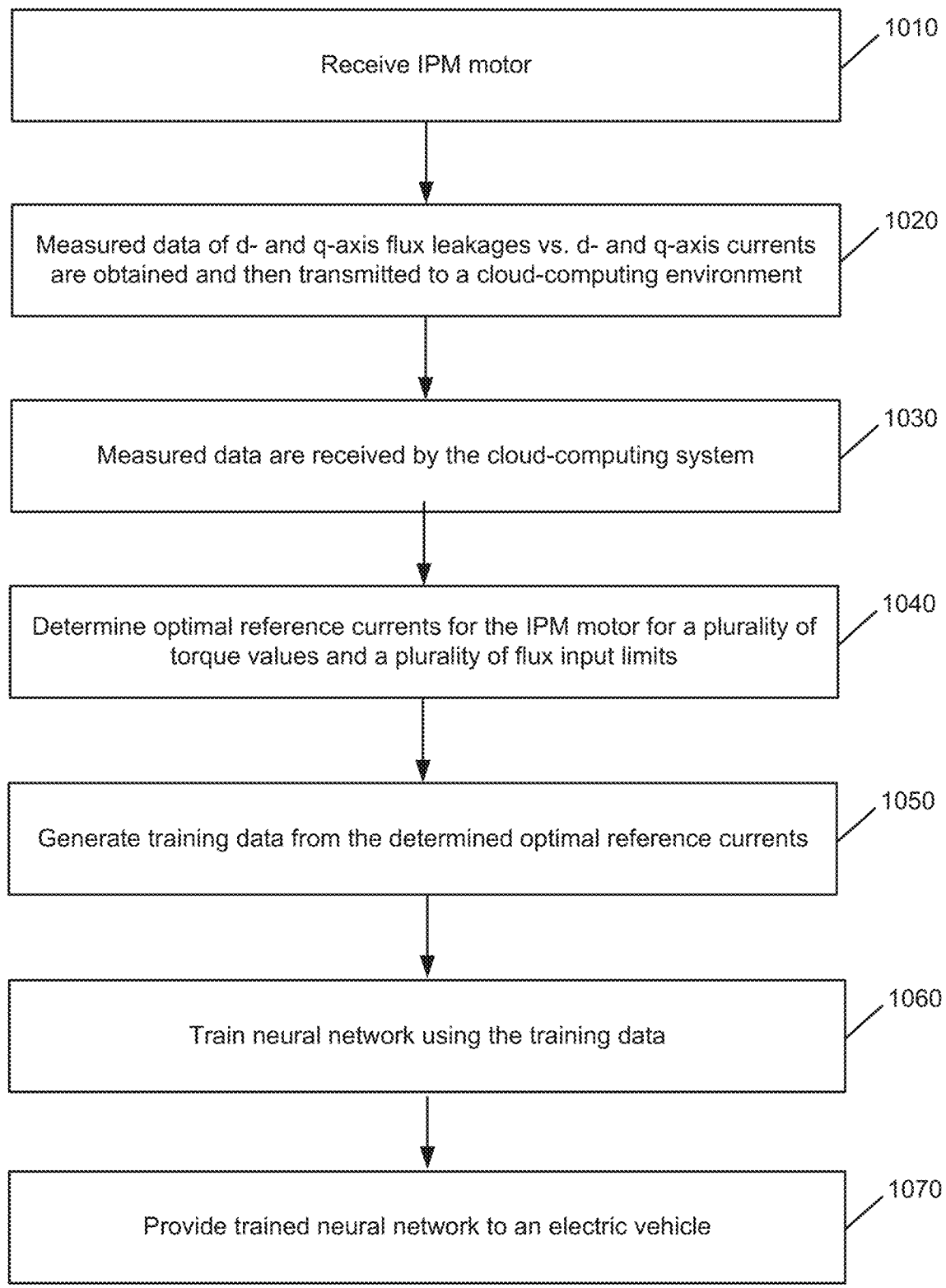
FIG. 10 is an illustration of an implementation of a method for training a neural network to generate optimal reference currents for an IPM motor.

FIG. 10 is an operational flow of an implementation of a method 1000 for training a neural network to generate optimal reference currents for an IPM motor. The neural network may be used in place of prior art look-up tables for determining optimal reference currents for a provided torque value. The method 1000 may be implemented by a general purpose computing device such as the computing device 1200 illustrated with respect to FIG. 12 and/or a cloud-based computing environment.

At 1010, an IPM motor is received. The IPM motor may be an electric motor. The IPM motor may be intended for use in an electric vehicle such as an electric car. Other types of IPM motors may be supported.

At 1020, measured data of d- and q-axis flux leakages vs. d- and q-axis currents are obtained and then transmitted to a cloud-computing environment.

At 1030, measured data of d- and q-axis flux leakages vs. d- and q-axis currents are received by the cloud-computing system.

At 1040, optimal reference currents for the IPM motor for a plurality of torque values and a plurality of flux input limits are determined based on the measured data of d- and q-axis flux leakages vs. d- and q-axis currents. The optimal reference currents may include a d-axis reference current and a q-axis reference current. Depending on the embodiment, the optimal reference currents may be determined from one or more lookup tables associated with the IPM motor.

At 1050, training data is generated from the determined optimal reference currents. The training data may be generated by the computing device 1200 and may include a plurality of tuples. Each tuple may include a desired torque value, a measured flux input, an optimal d-axis current, and an optimal q-axis current.

At 1060, the neural network is trained using the training data. The neural network may be trained by the cloud-computing environment.

At 1070, the trained neural network is provided. The trained neural network may be provided by the cloud-computing environment to an electric vehicle. The electric vehicle may use the neural network to generate optimal reference currents for selected torque values and measured flux input limits.

Figure 11:
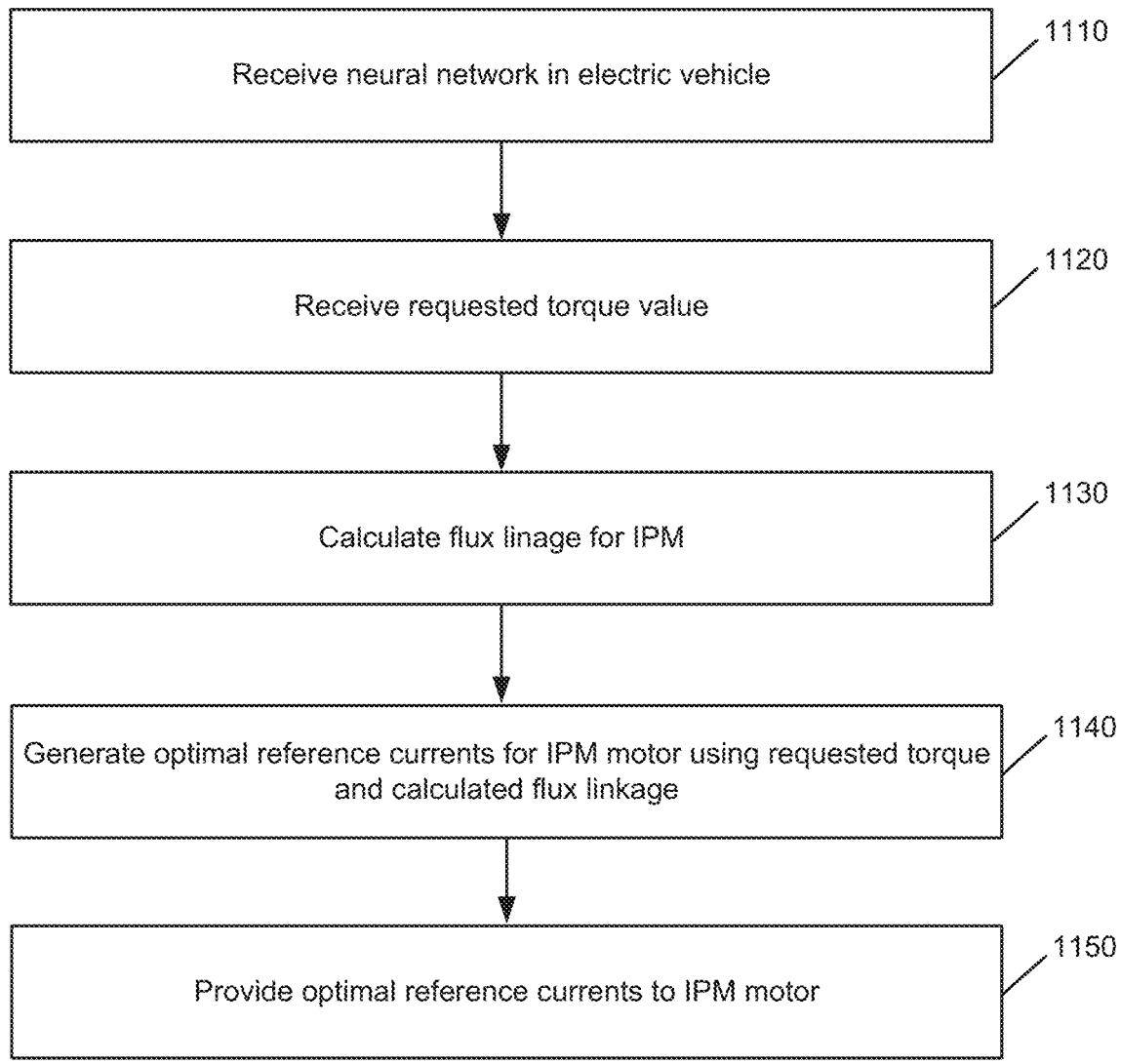
FIG. 11 is an operational flow of an implementation of a method for generating optimal reference currents for an IPM motor using a neural network.

FIG. 11 is an operational flow of an implementation of a method 1100 for generating optimal reference currents for an IPM motor using a neural network. The neural network may be used in place of prior art look-up tables for determining optimal reference currents for a provided torque value. The method 1100 may be implemented by a general purpose computing device such as the computing device 1200 illustrated with respect to FIG. 12, an electric vehicle, or a cloud-based computing environment.

At 1110, a neural network is received. The neural network may be received by an electric vehicle that includes an IPM motor associated with the neural network. The neural network may have been trained using a cloud-based computing environment to generate optimal reference currents for the IPM motor given a requested torque value and a current flux linkage limit measured for the IPM motor.

At 1120, a requested torque value is received. The requested torque value may be received from a navigation or control system associated with the electric vehicle.

At 1130, the flux linkage limit for the IPM motor is calculated. Depending on the embodiment, the flux linkage limit may be calculated based on an inverter DC voltage of the IMP motor and a current speed of the IPM motor.

At 1140, optimal reference currents for the IPM motor are determined using the requested torque and the calculated flux linkage. In particular, the neural network may take as an input the requested torque and calculated flux linkage limit and may output the optimal reference currents. The reference currents may include a d-reference current and a q-reference current.

At 1150, the optimal reference currents are provided to the IPM motor. The optimal reference currents are applied to the IPM motor to achieve the requested torque.

Figure 12:
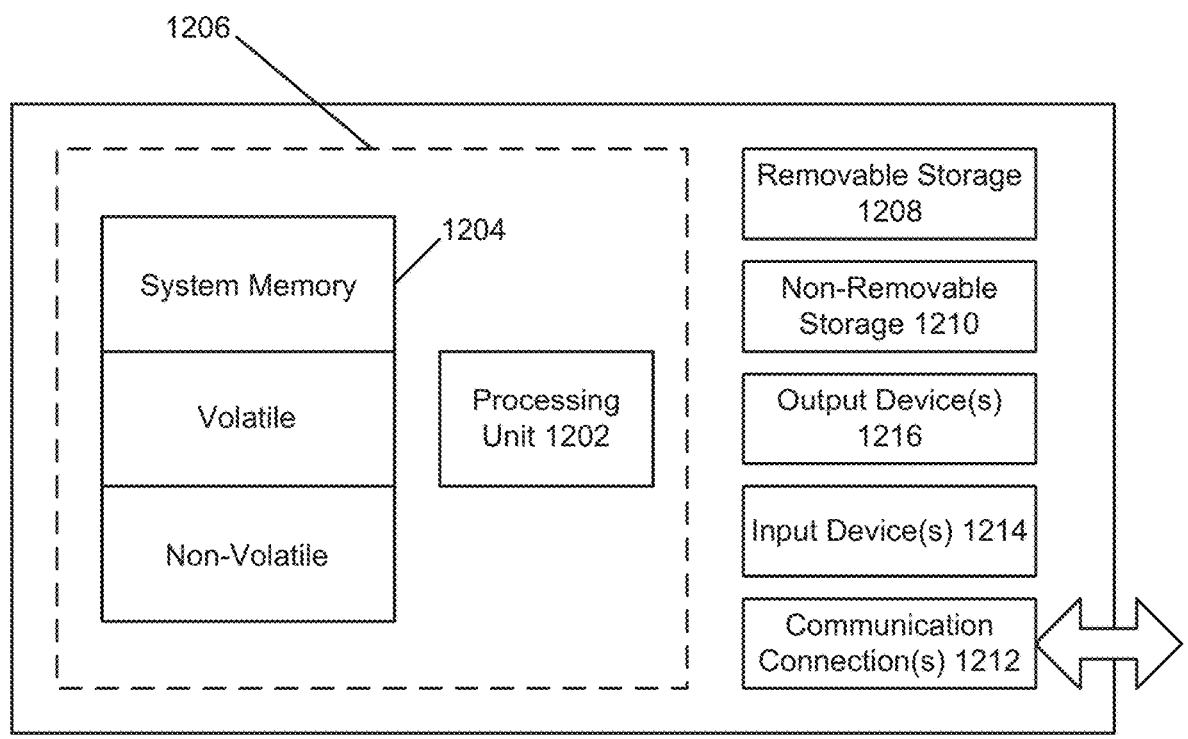
FIG. 12 shows an exemplary computing environment in which example embodiments and aspects may be implemented.

FIG. 12 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210.

Computing device 1200 typically includes a variety of computer readable media. Computer readable media can be any available media that can be accessed by the device 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200.

Computing device 1200 may contain communication connection(s) 1212 that allow the device to communicate with other devices. Computing device 1200 may also have input device(s) 1214 such as a keyboard, mouse, pen, voice input device, touch input device, etc. Output device(s) 1216 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling an interior permanent magnet (IPM) motor comprising:
    collecting a plurality of input tuples using the IPM motor, wherein each tuple comprises a torque value, a flux input limit, and optimal d-current and q-current values for the torque value and the flux input limit;
    training a neural network using the plurality of input tuples;
    receiving a request for torque from a computing device;
    using the neural network to calculate a set of reference currents for the requested torque; and
    applying the set of reference currents to the IPM motor.

2. The method of claim 1, wherein the set of reference currents comprise a d-reference current and a q-reference current.

3. The method of claim 1, wherein the IPM motor is part of an electric vehicle and request for torque is received from a control component of the electric vehicle.

4. The method of claim 1, further comprising:
    calculating a flux linkage limit for the IPM motor; and
    using the neural network to calculate the set of reference currents for the requested torque and the calculated flux linkage.

5. The method of claim 4, further comprising:
    determining an inverter DC voltage of the IPM motor;
    determining a current speed of the IPM motor; and
    calculating the flux linkage limit based on the inverter DC voltage and the current speed.

6. The method of claim 1, further comprising:
    collecting the plurality of tuples in a cloud-based computing environment; and
    training the neural network using the plurality of tuples in the cloud-based computing environment.

7. The method of claim 6, wherein collecting the plurality of tuples comprises collecting sufficient tuples to cover a plurality of different IPM motor operations over a full speed range of the IPM motor.

8. The method of claim 1, wherein the plurality of input tuples are collected in a random manner.

9. A method for training a neural network to generate optimal reference currents for an IPM motor comprising:
    determining optimal reference currents for an IPM motor for a plurality of desired torque values and a plurality of flux input limits by a computing device;
    generating training data for the IPM motor, wherein the training data comprises a plurality of tuples and each tuple comprises a torque value of the desired torque values, a flux input limit of the plurality of flux input limits, and optimal reference currents determined for the torque value and the flux input limit by the computing device; and
    training a first neural network using the generated training data by the computing device.

10. The method of claim 9, wherein the first neural network is trained in a cloud-computing environment.

11. The method of claim 9, further comprising:
    receiving a request for torque;
    passing the requested torque through a torque limiter to ensure that the requested torque is below a maximum allowable torque;
    after passing the requested torque through the torque limiter, using the first neural network to calculate a set of optimal reference currents for the requested torque; and
    applying the set of reference currents to the IPM motor.

12. The method of claim 11, wherein the torque limiter comprises a second neural network that is trained in a cloud computing environment.

13. The method of claim 11, wherein the IPM motor is part of an electric vehicle and request for torque is received from a control component of the electric vehicle.

14. The method of claim 11, further comprising:
calculating a flux linkage limit for the IPM motor; and
using the neural network to calculate the set of reference currents for the requested torque and the calculated flux linkage limit.

15. The method of claim 14, further comprising:
determining an inverter DC voltage of the IPM motor;
determining a current speed of the IPM motor; and
calculating the flux linkage limit based on the inverter DC voltage and the current speed.

16. An electric vehicle comprising:
an IPM motor;
a neutral network, wherein the neural network is trained using a plurality of input tuples, wherein each tuple comprises a torque value, a flux input limit, and optimal d-current and q-current values for the torque value and the flux input limit for the IPM motor; and
a control system adapted to:
receive a request for torque;
use the neural network to calculate a set of reference currents for the requested torque; and
apply the set of reference currents to the IPM motor.

17. The electric vehicle of claim 16, wherein the set of reference currents comprise a d-reference current and a q-reference current.

18. The electric vehicle of claim 16, wherein the control system is adapted to:
calculate a flux linkage limit for the IPM motor; and
use the neural network to calculate the set of reference currents for the requested torque and the calculated flux linkage limit.

19. The electric vehicle of claim 18, wherein the control system is adapted to:
determine an inverter DC voltage of the IPM motor;
determine a current speed of the IPM motor; and
calculate the flux linkage limit based on the inverter DC voltage and the current speed.

* * * * *